H. B. Cage.
Cotton Chopper.

Nº 95,661.      Patented Oct. 12, 1869.

Witnesses.
S. C. Kenion.
C. A. Pettit.

Inventor.
N. B. Cage.
by Munn & Co.
Attys.

UNITED STATES PATENT OFFICE.

H. B. CAGE, OF MADISON STATION, MISSISSIPPI.

IMPROVEMENT IN COTTON CHOPPERS AND SCRAPERS.

Specification forming part of Letters Patent No. 95,651, dated October 12, 1869.

*To all whom it may concern:*

Be it known that I, H. B. CAGE, of Madison Station, in the county of Madison and State of Mississippi, have invented a new and Improved Cotton Chopper and Scraper; and I do hereby declare that the following is a full, clear, and exact description of the construction and operation of the same, reference being had to the accompanying drawings, making a part of this specification, in which—

Figure 1:
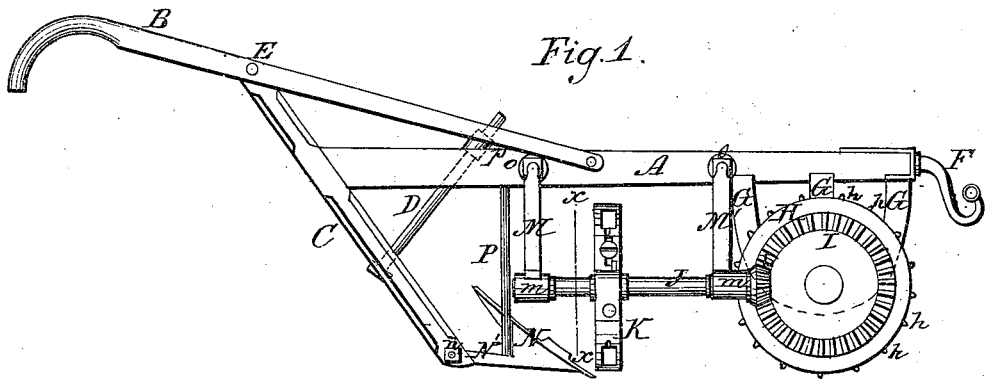
Figure 2:
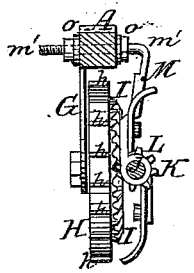

Figure 1 is a side view. Fig. 2 is a section through line $x$ $x$ of Fig. 1.

The object of this invention is to provide for public use a simple and cheap cotton chopper and scraper, so constructed that the chopper-shaft can be conveniently removed and the instrument then used either as a scraper or ordinary plow.

In the drawings, A represents a plow-beam; B B the handles; C, the standard; D, a brace; E, a round supporting the handle; F, the clevis; G, the plate which supports the wheel or roller; H, the wheel, having notches or ribs $h$ $h$ on its face to bite the ground more effectually; I, a bevel-cog rim on the right side of wheel H; J, the chopper-shaft; K, the chopper; L, the bevel-gear on the forward end of shaft J, connecting the latter with the rim I; M M', two bent rods, having bearings $m$ $m$ on their lower ends to support shaft J, and a horizontal arm, $m'$, at their upper ends, which extends laterally through beam A, and is adjustable, by means of a screw and nuts $o$, so that by setting the arms in or out the shaft will be in or out of gear with the driving-wheel H, while by taking off the nuts on the left side of the beam the whole shaft J, with the arms M M' and chopper K, can be entirely removed. The plate G is also attached to the beam by means of screws, or by a device similar to that which fastens the chopper-shaft in place, so that the wheel H can also be removed, and, if necessary, a smaller one substituted in its place.

N is a scraper or plow, the landside N' of which is pivoted to the lower end of the standard C at $n$, the forward end of the scraper or plow being supported and rendered adjustable in height and inclination by means of a vertical rod, P, having a screw-nut, $p$, on its upper end above the plow-beam.

If desired, the parts N P may be removed, and a "diamond" cultivator-blade, or any other form of plow, may be attached to the standard C.

The advantages of this device are, besides its cheapness and the ease and readiness with which it can be adjusted, put into and out of gear, &c., first, the ease with which the chopper can be removed, so as to make the instrument simply a cotton-scraper; and, secondly, the ease with which the scraper itself can be removed, together with the large wheel H and plate G, and another wheel and plow or cultivator-blade substituted therefor, so as to convert the instrument into a common plow or cultivator.

Having thus described my invention, what I claim as new, and desire to secure by Letters Patent, is—

1. Attaching the chopper K and its shaft J to an ordinary plow-beam by means of the bent arms M M' and screw-nuts $o$ $o$, the several parts being combined and arranged substantially as and for the purposes specified.

2. Attaching the scraper N to the standard C by a shank or landside, N', and a bolt, $n$, arranged as set forth, so that by means of a vertical rod, P, and screw-nut $p$, operating in connection with said parts, as described, the inclination of the scraper can be adjusted at pleasure.

3. The device as a whole, consisting of the beam A, plate G, wheel H, rim I, shaft J, chopper K, arms M M', scraper N, post C, rod P, brace D, handles B B, and round E, all constructed and operating substantially as and for the purposes specified.

H. B. CAGE.

Witnesses:
WILL J. BAILEY,
A. H. FORD.